US010969493B2

(12) United States Patent
Nishita et al.

(10) Patent No.: US 10,969,493 B2
(45) Date of Patent: Apr. 6, 2021

(54) DATA PROCESSING DEVICE, DATA PROCESSING METHOD, AND DATA PROCESSING PROGRAM

(71) Applicant: TOPCON CORPORATION, Tokyo (JP)

(72) Inventors: Nobuyuki Nishita, Tokyo (JP); You Sasaki, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 296 days.

(21) Appl. No.: 16/129,960

(22) Filed: Sep. 13, 2018

(65) Prior Publication Data
US 2019/0086548 A1    Mar. 21, 2019

(30) Foreign Application Priority Data

Sep. 19, 2017   (JP) .............................. JP2017-178831

(51) Int. Cl.
| | |
|---|---|
| *G01S 17/933* | (2020.01) |
| *G01S 17/42* | (2006.01) |
| *G08G 5/00* | (2006.01) |
| *G01S 17/66* | (2006.01) |
| *G01S 7/481* | (2006.01) |
| *G01S 17/86* | (2020.01) |
| *B64C 39/02* | (2006.01) |

(52) U.S. Cl.
CPC .......... *G01S 17/933* (2013.01); *G01S 7/4817* (2013.01); *G01S 17/42* (2013.01); *G01S 17/66* (2013.01); *G01S 17/86* (2020.01); *G08G 5/0026* (2013.01); *G08G 5/0069* (2013.01); *G08G 5/0082* (2013.01); *B64C 39/024* (2013.01); *B64C 2201/123* (2013.01); *B64C 2201/145* (2013.01)

(58) Field of Classification Search
CPC .... G01S 17/933; G01S 17/86; G01S 17/4817; G01S 17/42; G01S 17/66; G08G 5/0026; G08G 5/0069; G08G 5/0082; B64C 39/024; B64C 39/123; B64C 39/145
USPC .......................................................... 702/153
See application file for complete search history.

(56) References Cited

U.S. PATENT DOCUMENTS

| | | | |
|---|---|---|---|
| 4,047,816 A | * | 9/1977 | Pell .................... G01B 11/26 356/139.03 |
| 4,735,508 A | * | 4/1988 | Bellio ................. G01B 11/255 209/524 |
| 7,861,423 B2 | | 1/2011 | Kumagai et al. |

(Continued)

FOREIGN PATENT DOCUMENTS

| | | |
|---|---|---|
| JP | 2008268004 A | 11/2008 |
| JP | 2009229192 A | 10/2009 |

(Continued)

*Primary Examiner* — Gregory J Toatley, Jr.
*Assistant Examiner* — Aeysha N Sultana
(74) *Attorney, Agent, or Firm* — Chiesa Shahinian & Giantomasi PC

(57) ABSTRACT

A technique is provided for measuring attitude of an aerial vehicle without using a highly accurate IMU. A total station (TS) for tracking a UAV includes a laser scanner. The laser scanner is made to emit laser scanning light to the UAV that is flying. The UAV has four identifiable targets, and identification and locating of the four targets are performed by means of laser scanning. The attitude of the UAV is calculated on the basis of the locations of the four targets.

7 Claims, 6 Drawing Sheets

(56) References Cited

U.S. PATENT DOCUMENTS

| | | |
|---|---|---|
| 7,969,558 B2 | 6/2011 | Hall |
| 8,767,190 B2 * | 7/2014 | Hall |
| 9,111,444 B2 * | 8/2015 | Kaganovich ............. G06T 7/38 |
| 9,523,575 B2 | 12/2016 | Kumagai et al. |
| 9,613,539 B1 * | 4/2017 | Lindskog ................ G08G 5/04 |
| 10,101,443 B1 * | 10/2018 | LeGrand, III ......... B64D 43/02 |
| 2009/0235541 A1 | 9/2009 | Kumagai et al. |
| 2009/0241358 A1 | 10/2009 | Ohtomo et al. |
| 2010/0256839 A1 | 10/2010 | Fitzpatrick |
| 2010/0256940 A1 | 10/2010 | Ogawa et al. |
| 2012/0218546 A1 | 8/2012 | Ogawa et al. |
| 2012/0242830 A1 | 9/2012 | Kumagai et al. |
| 2015/0206023 A1 | 7/2015 | Kochi et al. |
| 2015/0293224 A1 | 10/2015 | Eldada et al. |
| 2017/0029107 A1 * | 2/2017 | Emami ................ G08G 5/0026 |
| 2017/0248969 A1 * | 8/2017 | Ham ................... G08G 5/0086 |

FOREIGN PATENT DOCUMENTS

| | | | |
|---|---|---|---|
| JP | 2010151682 A | 7/2010 | |
| JP | 2010241409 A | 10/2010 | |
| JP | 2012202821 A | 10/2012 | |
| JP | 2012230594 A | 11/2012 | |
| JP | 5124319 B2 | 1/2013 | |
| JP | 2014035702 A | 2/2014 | |
| JP | 5725922 B2 | 5/2015 | |
| JP | 2018119852 A | 8/2018 | |
| WO | 2011070927 A | 4/2013 | |

* cited by examiner

DATA PROCESSING DEVICE, DATA PROCESSING METHOD, AND DATA PROCESSING PROGRAM

CROSS-REFERENCE TO RELATED APPLICATIONS

This application is based upon and claims benefit of priority from Japanese Patent Application No. 2017-178831, filed Sep. 19, 2017, the entire contents of which are incorporated herein by reference

BACKGROUND OF THE INVENTION

The present invention relates to a technique for measuring attitude of an aerial vehicle.

A technique using laser scanning that is performed from an aerial vehicle may require information of both location and attitude of the aerial vehicle. The aerial vehicle may be, for example, an unmanned aerial vehicle (UAV). The requirement may also apply to aerial photogrammetry using a UAV. Accurate information of attitude can be obtained by using a highly accurate inertial measurement unit (IMU), as disclosed in, for example, Japanese Unexamined Patent Application Laid-Open No. 2010-241409. However, such a highly accurate IMU is normally expensive, large, and heavy. A UAV has an advantage of being useable at a low cost, but the UAV has a limit in volume and weight of on-board equipment. From this point of view, measuring attitude of a UAV by a highly accurate IMU is not practical.

SUMMARY OF THE INVENTION

An object of the present invention is to provide a technique that enables measurement of the attitude of an aerial vehicle without using a highly accurate IMU.

A first aspect of the present invention provides a data processing device including a laser scanning data obtaining unit and an attitude calculator. The laser scanning data obtaining unit obtains laser scanning data that is obtained by emitting laser scanning light from a laser scanner to an aerial vehicle that is flying. The laser scanner is fixed relative to a first coordinate system. The attitude calculator calculates an attitude in the first coordinate system of the aerial vehicle that is flying, on the basis of the laser scanning data. The attitude is calculated by using multiple positions in the aerial vehicle, which are identified on the basis of the laser scanning data.

According to a second aspect of the present invention, in the first aspect of the present invention, the aerial vehicle may include multiple targets that are identifiable, and the laser scanning data may be obtained by means of laser scanning performed on the multiple targets of the aerial vehicle.

According to a third aspect of the present invention, in the second aspect of the present invention, the multiple targets may be identified on the basis of a difference in the dimensions of the targets. According to a fourth aspect of the present invention, in the second or the third aspect of the present invention, the multiple targets may respectively have a curved reflective surface, and the multiple targets may be identified on the basis of a difference in radius of curvature of the curved reflective surfaces.

According to a fifth aspect of the present invention, in any one of the second to the fourth aspects of the present invention, a location of each of the multiple targets may be identified by calculating a center of curvature of the corresponding curved reflective surface. According to a sixth aspect of the present invention, in any one of the second to the fifth aspects of the present invention, the multiple targets may be identified on the basis of a difference in color of surfaces of the targets.

According to a seventh aspect of the present invention, in any one of the second to the sixth aspects of the present invention, the data processing device may further include a scanning area setting unit that sets an area containing at least two of the multiple targets, as a laser scanning area on the basis of a location of the aerial vehicle. The location of the aerial vehicle may be obtained by a location data obtaining unit that obtains data of location of the aerial vehicle in the first coordinate system.

According to an eighth aspect of the present invention, in any one of the second to the seventh aspects of the present invention, the data processing device may further include a location data obtaining unit that obtains data of location of the aerial vehicle in the first coordinate system. The attitude may be calculated on the basis of the location of the aerial vehicle in the first coordinate system and the locations of at least two of the multiple targets. According to a ninth aspect of the present invention, in any one of the first to the eighth aspects of the present invention, the attitude may be calculated on the basis of data of the laser scanning light reflected from the aerial vehicle.

A tenth aspect of the present invention provides a data processing method including obtaining laser scanning data by emitting laser scanning light from a laser scanner to an aerial vehicle that is flying. The laser scanner is fixed relative to a first coordinate system. The method also includes calculating an attitude in the first coordinate system of the aerial vehicle that is flying, on the basis of the laser scanning data. The attitude is calculated by using multiple positions of the aerial vehicle, which are identified on the basis of the laser scanning data.

An eleventh aspect of the present invention provides a non-transitory computer recording medium storing computer executable instructions for processing data, and the computer executable instructions that, when executed by a computer processor, cause the computer processor to function as a data processing device. The data processing device includes a laser scanning data obtaining unit and an attitude calculator. The laser scanning data obtaining unit obtains laser scanning data that is obtained by emitting laser scanning light from a laser scanner to an aerial vehicle that is flying. The laser scanner is fixed relative to a first coordinate system. The attitude calculator calculates an attitude in the first coordinate system of the aerial vehicle that is flying, on the basis of the laser scanning data. The attitude is calculated by using multiple positions in the aerial vehicle, which are identified on the basis of the laser scanning data.

The present invention provides a technique that enables measurement of attitude of an aerial vehicle without using a highly accurate IMU.

DESCRIPTION OF THE EMBODIMENTS

Outline

Figure 1:
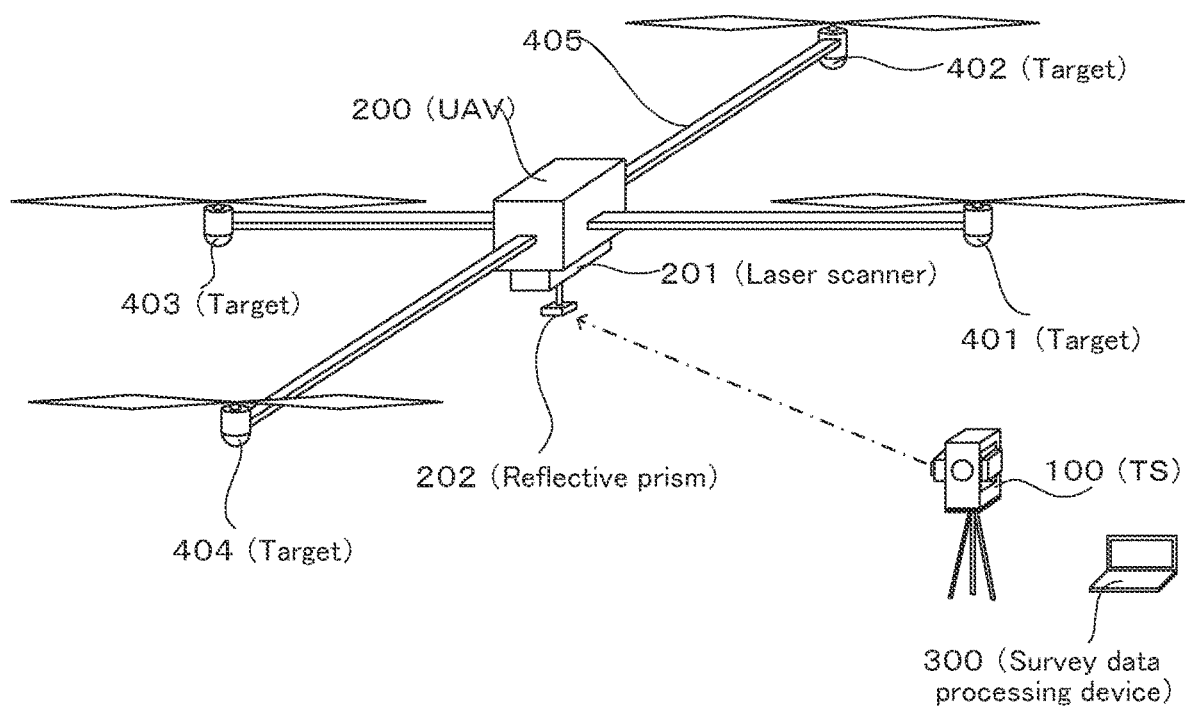
FIG. 1 is an overview of an embodiment.

An overview of this embodiment is shown in FIG. 1. FIG. 1 shows a flying UAV 200 and a total station (TS) 100 that performs positioning of the UAV 200 while tracking. FIG. 1 shows a condition in which a laser scanner 201 is mounted on a UAV 200 in order to perform laser scanning of an object, such as a ground or a building, while the UAV 200 is made to fly, thereby obtaining three-dimensional laser scanning point clouds of the object as point cloud data.

The UAV 200 is a commercially available vehicle and includes a controlling unit for autonomous flight in accordance with a flight plan, a laser scanner 201, a communicating unit, a location identifying unit using a GNSS or a GPS receiver, an inertial measurement unit (IMU), an azimuth sensor, and a storage that stores a flight log and laser scanning data. The IMU of the UAV 200 has an accuracy of a degree usable for flight control but is not suitable for calculation of exterior orientation parameters of the laser scanner 201. The UAV 200 includes a dedicated reflective prism 202 at a center of a bottom part. The reflective prism 202 has an optical function of reflecting incident light by turning the direction of the incident light by 180 degrees.

The laser scanner 201 mounted on the UAV 200 includes a clock that uses time information of a navigation signal from a navigation satellite of a GNSS and obtains the time of acquiring each point at the same time as obtaining of the laser scanning data. The laser scanning data representing location data of each point and the time of acquiring the laser scanning data are stored in the storage mounted on the UAV 200. The basic function and the basic structure of the laser scanner 201 are the same as those of a laser scanner 112 mounted on the TS 100, which is described later. Normally, in view of reduction in weight and in amount of electric power consumption, the laser scanner 201 has a structure and functions that are simple compared with the laser scanner 112.

Figure 3:
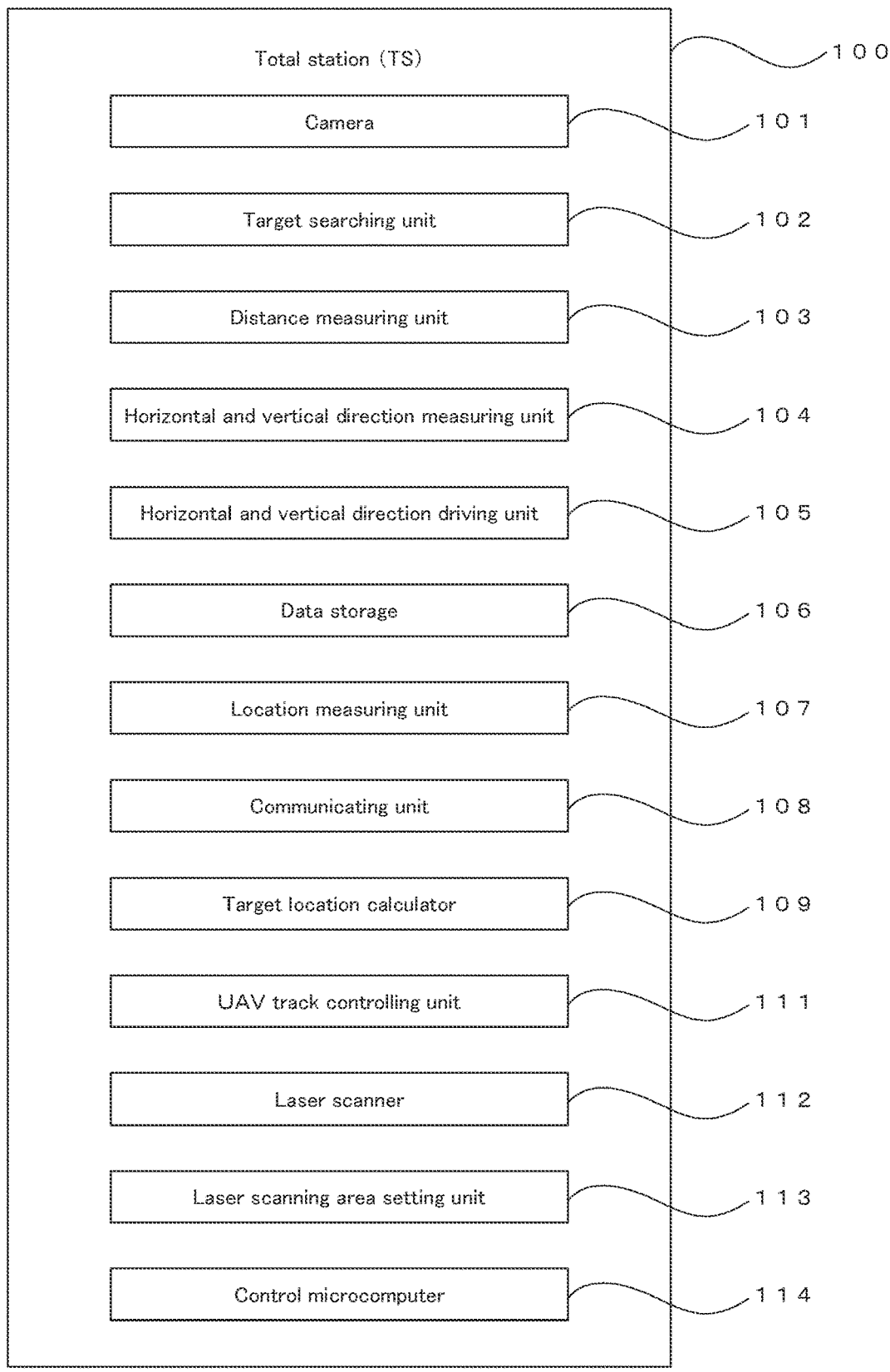
FIG. 3 is a block diagram of the embodiment.

The TS 100 tracks and determines the positions the UAV 200 that is flying. The TS 100 also uses a navigation signal from a GNSS and thereby obtains positioning data of the UAV 200 and the time of acquiring the positioning data. These data are stored in a storage of the TS 100 or in a data storage unit connected to the TS 100. The TS 100 includes a laser scanner 112, as shown in FIG. 3, and the TS 100 measures and determines attitude of the UAV 200 by using a laser scanning function of the laser scanner 112. The details of the TS 100 are described later.

FIG. 1 also shows a survey data processing device 300 that is implemented by using a personal computer (PC). The survey data processing device 300 converts coordinates of the laser scanning data obtained by the laser scanner 201, into coordinates in a ground coordinate system having the origin at the TS 100. Further, the survey data processing device 300 generates a three-dimensional model on the basis of the laser scanning data that is subjected to the coordinate conversion. At this time, attitude of the UAV 200 is calculated. The survey data processing device 300 can also be used as a device for calculating attitude of the UAV 200. The details of the survey data processing device 300 are described later.

This embodiment is described by using an example of a case of performing laser scanning from a UAV. However, the technique of this embodiment can also be used to measure or determine attitude of a UAV in aerial photogrammetry under the condition that a camera is mounted on the UAV. This embodiment is not limited to an operation of making an aerial vehicle fly and can be widely used in a technique of measuring attitude of an aerial vehicle that is flying.

Description of Principle

The following describes a principle of coordinate conversion for converting the coordinate system of the laser scanning data obtained by the laser scanner 201 into a ground coordinate system having the origin at the TS 100. The coordinate conversion is performed by identifying a location of the UAV 200, determining attitude of the UAV 200, and converting a coordinate system fixed relative to the UAV 200 into a ground coordinate system. Each of the processes is described below.

Identification of Location of UAV

The location of the flying UAV 200, that is, a three-dimensional location in the air, is identified in real time by the TS 100. The coordinates of the location are described in an XYZ coordinate system of a ground coordinate system in FIG. 2. The TS 100 tracks the UAV 200 by tracking the reflective prism 202 mounted on the UAV 200 by using its own target tracking function, and the TS 100 positions the UAV 200 and identifies a three-dimensional location of the UAV 200 by using its own target positioning function. The target tracking function of the TS 100 for tracking the reflective prism 202 and the target positioning function of the TS 100 are described later.

The position relationship between the reflective prism 202 and the laser scanner 201 in the UAV 200 is examined in advance and is known. Also, information of attitude or orientation of the laser scanner 201 relative to the UAV 200 is also preliminarily obtained and is known. The identification of the location of the reflective prism 202 causes the location of the UAV 200 to be identified. In this embodiment, the location of the UAV 200 uses a location of the laser scanner 201 at the optical origin of laser scanning. The location of the UAV 200 may use a location of the structural center of the UAV 200, a location of the gravitational center of the UAV 200, a location of the IMU, or other locations.

Figure 2:
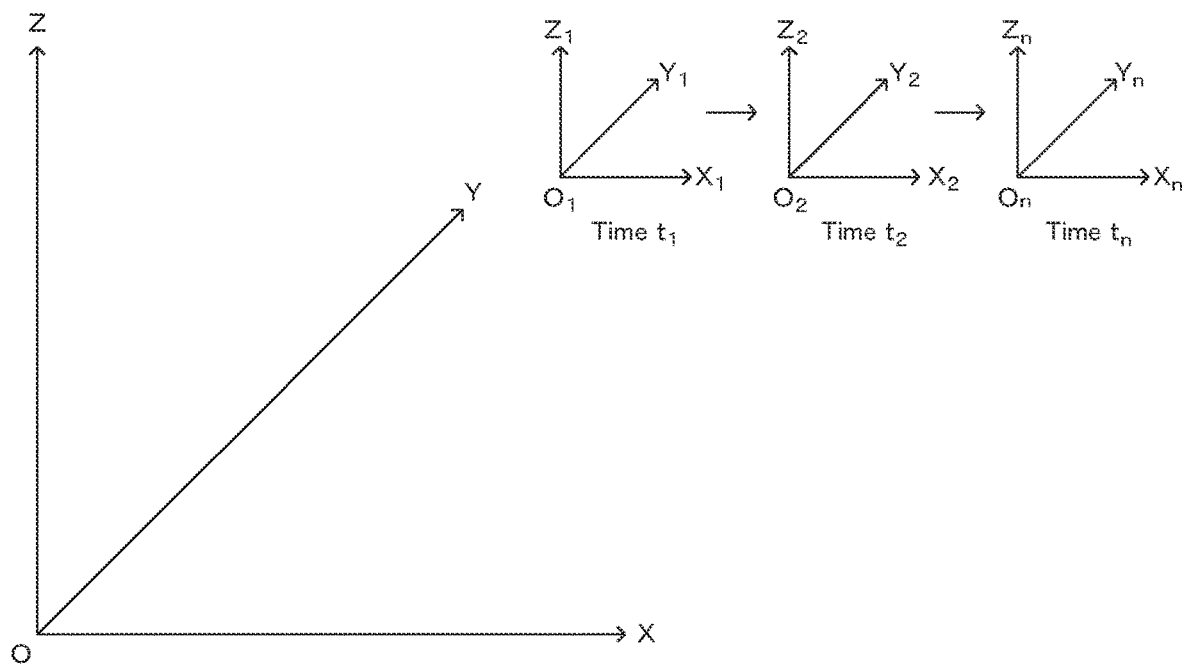
FIG. 2 shows relationships of coordinate systems.

The location of the TS 100 is preliminarily identified in the XYZ coordinate system of the ground coordinate system in FIG. 2. In this embodiment, the location of the TS 100 is set at the origin of the XYZ coordinate system. Thus, positioning the UAV 200 by the TS 100 allows identification of the location of the UAV 200 in the XYZ coordinate system of the ground coordinate system. Alternatively, or additionally, the UAV 200 may also be positioned and be identified from locations of semispherical reflective targets 401 to 404, which are described below.

Determination of Attitude of UAV

The UAV 200 includes three or more reflective targets that are identifiable from each other. The locations of the three or more reflective targets are identified by using the function of the laser scanner 112 mounted on the TS 100, to calculate the attitude of the UAV 200.

As shown in FIG. 1, the UAV 200 includes four arms 405 that extend in the four quadrants, and ends of the four arms 405 are respectively arranged with semispherical targets 401 to 404 that function as reflective targets. The targets 401 to 404 have semispherical metal reflective surfaces having different curvatures. The targets 401 to 404 are arranged so as to downwardly protrude in a vertical direction. The curvature and a position of the center of curvature relative to the UAV 200 of each of the targets 401 to 404 are obtained in advance and are known data.

The laser scanner 112 performs laser scanning of an area containing the targets 401 to 404, and laser scanning light reflected from the targets 401 to 404 enables calculation of the radius of the curvature of each of the targets 401 to 404. The difference in the radius of the curvature enables identification of the targets 401 and 404. The determination of the location of the center of curvature enables identification of the location of each of the four targets 401 to 404 in the XYZ coordinate system of the ground coordinate system. The technique for obtaining a radius or center of curvature of a semispherical or spherical target by means of laser scanning may be found in Japanese Patent Application No. 2017-011130.

For example, it is assumed that the semispherical target 401 is subjected to laser scanning by the laser scanner 112. In this case, a reflection point of the target 401, at which laser scanning light is reflected, exists along an outline of the spherical surface. A line connecting the reflection points is a curved line along a curved surface of the target 401, and multiple curved lines provide a curved surface composed of laser scanning point clouds. The radius of curvature of the curved surface serves as the radius of curvature of the target 401. The center of curvature of the curved surface serves as the center of curvature of the semispherical target 401. According to this principle, the radius and center of curvature of each of the targets 401 to 404 as viewed from the TS 100 are obtained.

The targets 401 to 404 are made to have different radiuses of curvature, and therefore, the targets 401 to 404 are identified (distinguished) from each other from the difference in the measured radiuses of curvature. Thus, a three-dimensional location of each of the targets 401 to 404 is identified.

For example, it may be determined that the targets 401 to 404 identified by means of the laser scanning by the laser scanner 112 respectively have three-dimensional locations $(x_1, y_1, z_1)$, $(x_2, y_2, z_2)$, $(x_3, y_3, z_3)$, and $(x_4, y_4, z_4)$.

In this case, it is assumed that the targets 401 and 404 are arranged in a front side of the UAV 200, whereas the targets 402 and 403 are arranged in a rear side of the UAV 200. Under these conditions, a surface containing the center of curvature of each of the targets 401 to 404 is determined, and a vector in the direction from the target 402 to the target 401 is calculated. As a result, the attitude or the direction of the UAV 200 is determined.

In addition, the location of the UAV 200 can be identified by positioning at least three of the targets 401 to 404. Specifically, under the conditions in which position relationships between the targets 401 to 404 and a part, of which position is used as the location of the UAV 200, are preliminarily obtained and are known, the locations of at least three of the targets 401 to 404 are positioned to identify the location of the UAV 200. The part is, for example, the laser scanner 201.

Description of Coordinate System

FIG. 2 shows an XYZ coordinate system that represents a ground coordinate system. The XYZ coordinate system is a three-dimensional orthogonal coordinate system having the origin O at the location of the TS 100 that is fixed relative to the ground. The direction of each coordinate axis of the XYZ coordinate system is freely selected, and for example, the Z-axis may be set in a vertical upward direction, the Y-axis may be set in the north direction, and the X-axis may be set in the direction of east.

It is assumed that a three-dimensional orthogonal coordinate system fixed relative to the UAV 200 that is flying is represented as $X_1Y_1Z_1$ coordinate system, $X_2Y_2Z_2$ coordinate system, . . . , and $X_nY_nZ_n$ coordinate system (n=1, 2, 3, . . . ). The $X_nY_nZ_n$ coordinate system is a local coordinate system fixed relative to the UAV 200 that travels, and thus, the location of the origin and the directions of the coordinate axes of the $X_nY_nZ_n$ coordinate system vary with the movement of the UAV 200. FIG. 2 shows an $X_1Y_1Z_1$ coordinate system at a time $t_1$, an $X_2Y_2Z_2$ coordinate system at a time $t_2$, and an $X_nY_nZ_n$ coordinate system at a time $t_n$ (n=1, 2, 3, . . . ).

In the case shown in FIG. 2, laser scanning that is performed by the laser scanner 201 mounted on the UAV 200 provides a laser scanning point cloud having the origin at a point $O_1$ in the $X_1Y_1Z_1$ coordinate system at the time $t_1$, a laser scanning point cloud having the origin at a point $O_2$ in the $X_2Y_2Z_2$ coordinate system at the time $t_2$, and a laser scanning point cloud having the origin at a point $O_n$ in the $X_nY_nZ_n$ coordinate system at the time $t_n$.

In one example, multiple beams of laser scanning light may be emitted at the same time, and beams of the laser scanning light reflected back may be measured. In this example, multiple scanning points in the $X_nY_nZ_n$ coordinate system are obtained simultaneously at the time $t_n$. In another example, scanning points that are obtained during a time period from a time $t_1$ to a time $t_2$ may be processed by considering them as scanning points that are obtained at the same time, such as a time at the midpoint between the times t1 and t2.

Unification of Scanning Data by Means of Coordinate Conversion

The following describes a process for unifying the $X_1Y_1Z_1$ coordinate system, the $X_2Y_2Z_2$ coordinate system, . . . , and the $X_nY_nZ_n$ coordinate system (n=1, 2, 3, . . . ), which are fixed relative to the UAV 200, into the XYZ coordinate system of the ground coordinate system. This process allows the laser scanning data that is obtained from the UAV 200 during flight, to be described by the XYZ axes in the ground coordinate system.

This process performs coordinate conversion of points in the $X_nY_nZ_n$ coordinate system into points in the XYZ coordinate system at the time $t_n$. That is, the process performs rotation of the $X_nY_nZ_n$ coordinate system at the time $t_n$ to make the direction of the $X_nY_nZ_n$ coordinate system match with the direction of the XYZ coordinate system, and the process further performs parallel movement of the $X_nY_nZ_n$ coordinate system to make the origins of the $X_nY_nZ_n$ coordinate system and the XYZ coordinate system coincide with each other. This process is mathematically represented by the following first formula in which a rotation matrix for the rotation is represented as $R_n$, and a vector for the parallel movement is represented as $T_n$, at the time $t_n$.

First Formula $$\begin{pmatrix} X \\ Y \\ Z \end{pmatrix} = \begin{pmatrix} X_n \\ Y_n \\ Z_n \end{pmatrix} R_n + \vec{T}_n$$

The process using the first formula is performed to every coordinate system represented by the $X_nY_nZ_n$ coordinate system (n=1, 2, 3, . . . ), whereby the laser scanning data obtained from the UAV 200 during flight is described in the ground coordinate system.

The rotation matrix $R_n$ in the first formula determines the way of rotation of the $X_nY_nZ_n$ coordinate system to cause the direction of the $X_nY_nZ_n$ coordinate system to match with the direction of the XYZ coordinate system. The rotation matrix $R_n$ depends on the direction of the $X_nY_nZ_n$ coordinate system relative to the XYZ coordinate system at the time $t_n$. Since the $X_nY_nZ_n$ coordinate system is fixed relative to the UAV 200, the direction of the $X_nY_nZ_n$ coordinate system relative to the XYZ coordinate system at the time $t_n$ is obtained from attitude or direction of the UAV 200 in the XYZ coordinate system of the ground coordinate system at the time $t_n$.

The attitude of the UAV 200 in the XYZ coordinate system is determined by using the targets 401 to 404. Thus, both identification of the locations of the targets 401 to 404 at the time $t_n$ and obtaining of the attitude of the UAV 200 in the XYZ coordinate system at the time $t_n$ provide a rotation matrix $R_n$ at the time $t_n$.

The vector $T_n$ is obtained as a vector starting from the origin $O_n$ in the $X_nY_nZ_n$ coordinate system at the time $t_n$ and ending at the origin O in the XYZ coordinate system. The origin O in the XYZ coordinate system is the installed location of the TS 100. The origin $O_n$ in the $X_nY_nZ_n$ coordinate system is a location of the UAV 200 or a light source location of the laser scanning light of the laser scanner 201, which is positioned by the TS 100. Thus, the vector $T_n$ is obtained as a vector connecting the origin O in the XYZ coordinate system and the location $O_n$ of the UAV 200.

The rotation matrix $R_n$ and the vector $T_n$ are obtained with respect to each time that is represented by the time $t_n$ associated with the corresponding $X_nY_nZ_n$ coordinate system. The rotation matrix $R_n$ and the vector $T_n$, which are obtained with respect to each time, are used to convert laser scanning points described in the $X_nY_nZ_n$ coordinate system, into points in the XYZ coordinate system. As a result, each of the laser scanning points is described in the XYZ coordinate system.

Configuration of Total Station (TS)

FIG. 3 shows a block diagram of the TS 100 illustrated in FIG. 1. The TS 100 includes a location measuring unit using a GNSS, a camera for obtaining an image, a laser scanning function for searching for and tracking a target, and a laser distance measuring function for measuring a distance to the target by using distance measuring laser light. The target is the reflective prism 202 of the UAV 200 in this embodiment. The TS 100 also includes a direction measuring function for measuring a direction of the target, of which the distance is measured by using the laser scanning light, in terms of a horizontal angle and a vertical angle (elevation angle or depression angle), a three-dimensional location calculating function for calculating a three-dimensional location of the target from the distance and direction to the target, a communicating function for communicating with an external device, and a laser scanning function for obtaining point cloud data.

Measuring the distance and direction to the target provides the location of the target relative to the TS 100. In the condition in which the location of the TS 100 is identified, a location of the target, in this case, the reflective prism 202 of the UAV 200, in the map coordinate system, is identified. For example, latitude, longitude, and elevation above mean sea level or XYZ coordinates in an orthogonal coordinate system are determined. This function is normally provided to a commercially available TS and is not special. The techniques relating to the TS may be found in Japanese Unexamined Patent Applications Laid-Open Nos. 2009-229192 and 2012-202821, for example. The map coordinate system is a coordinate system for describing map information in terms of, for example, latitude, longitude, and altitude. For example, location information obtained from a GNSS is normally described in the map coordinate system.

The TS 100 includes a camera 101, a target searching unit 102, a distance measuring unit 103, a horizontal and vertical direction measuring unit 104, a horizontal and vertical direction driving unit 105, a data storage 106, a location measuring unit 107, a communicating unit 108, a target location calculator 109, a UAV track controlling unit 111, a laser scanner 112, a laser scanning area setting unit 113, and a control microcomputer 114.

Each of the functional units shown in FIG. 3 may be constructed of dedicated hardware or may be constructed of software by using a microcomputer. Examples of hardware for implementing the functions in FIG. 3 include various types of electronic devices, such as a camera module for constituting a camera, a wireless module for constituting the communicating unit 108, various types of driving mechanisms using a motor or other unit, a sensor mechanism, optical parts, various types of electronic circuits, a central processing unit (CPU), an application specific integrated circuit (ASIC), and a field programmable gate array (FPGA). The hardware configuration described above also applies to the UAV 200.

The camera 101 photographs moving images or still images of an object to be surveyed, such as the UAV 200 or a target. The camera 101 uses a camera module having a CCD image sensor or a CMOS image sensor and takes photographs of the target to be surveyed, through a telescope, to obtain data of images of the target to be surveyed. Normally, approximate collimation for the target to be surveyed is performed by an operator by using a photographed image that is taken through the telescope by the camera 101, and then, fine collimation for the target is performed by autonomous operation of an automatically tracking function. The data of the photographed images taken by the camera 101 is stored in an appropriate storage region in association with measurement times, measurement directions, measurement distances, locations, and other parameters, of the object, for which distance is to be measured.

The target searching unit 102 searches for and tracks a target, such as the reflective prism 202, by using searching laser light that is composed of triangular pyramid-shaped or fan-shaped beams. The target is searched for and is tracked by using a reference location set at the TS 100. The technique relating to searching for and tracking a target by a TS may be found in Japanese Patent No. 5124319, for example.

The distance measuring unit 103 measures a distance to the target by using distance measuring laser light. The distance measuring unit 103 includes a light emitting element for distance measuring laser light, an irradiating optical system, a light receiving optical system, a light receiving element, a distance measuring operator, and an optical path for reference light for measuring a distance. The distance to an object or a target is calculated from a phase difference between the distance measuring laser light reflected from the object or the target and the reference light. The calculation method of the distance is the same as a method in an ordinary laser distance measurement.

The horizontal and vertical direction measuring unit 104 measures a horizontal angle and a vertical angle (elevation angle or depression angle) as viewed from the TS 100, of the target of which the distance is measured by the distance measuring unit 103. The target is the reflective prism 202 in this embodiment. An optical system for the target searching unit 102 and the distance measuring unit 103 is provided to a casing part of which horizontal rotation and elevation or depression angle are controllable. The horizontal angle and the vertical angle are measured by an encoder. The output of the encoder is received by the horizontal and vertical direction measuring unit 104, and the horizontal angle and the vertical angle (elevation angle or depression angle) are measured. The output from the horizontal and vertical direction measuring unit 104 provides the direction of the reflective prism 202 as viewed from the TS 100.

The horizontal and vertical direction driving unit 105 includes a motor, a driving circuit for the motor, and a controlling circuit for the driving circuit. The motor controls the horizontal rotation, the elevation angle, and the depression angle of the casing part, which has the optical system for the target searching unit 102 and the distance measuring unit 103. The casing part also contains the laser scanner 112, which is described later. The data storage 106 stores control programs necessary for operating the TS 100, various kinds of data, survey results, and other information.

The location measuring unit 107 measures the location of the TS 100 by using the GNSS. The location measuring unit 107 can perform both of relative positioning and independent positioning. Under circumstances that allow the relative positioning, the location of the TS 100 is preferably measured by the relative positioning. However, in a case in which the relative positioning is difficult to perform, the location of the TS 100 is measured by independent positioning.

The communicating unit 108 communicates with an external device. The TS 100 can be operated by an external terminal, such as a dedicated terminal, a PC, a tablet, a smartphone, or other device, and the TS 100 can communicate with the external terminal by using the communicating unit 108. The communicating unit 108 receives various data necessary for operating the TS 100 and outputs various data obtained by the TS 100, to the outside. For example, the TS 100 can obtain various kinds of pieces of information relating to surveying, by accessing a data server that handles map information and terrain information through an internet line.

The target location calculator 109 calculates the location of the target relative to the TS 100 in terms of coordinates from the distance and direction to the target. The target is the reflective prism 202 mounted on the UAV 200 in this embodiment. The distance to the target is obtained by the distance measuring unit 103, and the direction of the target is obtained by the horizontal and vertical direction measuring unit 104. Since the location of the TS 100 serving as the reference location is identified by the location measuring unit 107, the location of the target in the map coordinate system is identified by calculating the location of the target relative to the TS 100. The map coordinate system can be represented by the XYZ coordinate system in FIG. 2.

The UAV track controlling unit 111 controls tracking of a captured UAV 200. That is, the UAV track controlling unit 111 controls orientation of the TS 100 in accordance with variation in the incident direction of the searching light, which is reflected back from the UAV 200 and is measured by the target searching unit 102, to cause the optical axis of the TS 100 to continuously orient the UAV that is traveling in the air. Specifically, the UAV track controlling unit 111 detects variation in the incident direction relative to the TS 100 of the searching light that is reflected back from the target, which is the reflective prism 202 in this embodiment. Further, in response to detection of the variation, the UAV track controlling unit 111 outputs a control signal to the horizontal and vertical direction driving unit 105 to cause the optical axis of the TS 100 or the optical axis of the distance measuring laser light from the distance measuring unit 103 continuously faces the location of the reflective prism 202.

The laser scanner 112 obtains point cloud data including a laser scanning point cloud by using the distance measuring laser light as laser scanning light. The point cloud data shows an object or a target in the form of a set of dots for which three-dimensional coordinates are determined. In this example, the target searching unit 102 and the laser scanner 112 are separate units, and the laser scanner 112 operates independently from the target searching unit 102.

The laser scanner 112 is provided to the casing part containing the optical system of the target searching unit 102 and the distance measuring unit 103, and the laser scanner 112 performs laser scanning in a range having a center at an optical axis of the optical system of the target searching unit 102 and the distance measuring unit 103.

The laser scanning light of the laser scanner 112 has a wavelength different from that of the laser scanning light of the target searching unit 102 so as to not interfere with the laser scanning light of the target searching unit 102. The laser scanner may be found in, for example, Japanese Unexamined Patent Applications Laid-Open Nos. 2010-151682 and 2008-268004 and U.S. Pat. Nos. 8,767,190 and 7,969,558. The laser scanner 112 may employ an electronically scanning type, such as one disclosed in US 2015/0293224.

The following describes details of the laser scanner 112. The laser scanner 112 includes an emitting unit that emits distance measuring laser light, a light receiving unit that receives the distance measuring laser light reflected back from an object or a target, a distance measuring unit that measures a distance to the object or the target on the basis of a time-of-flight of the distance measuring laser light, and a distance measuring-direction measuring unit that measures an emitting direction of the distance measuring laser light as a distance measuring direction. The laser scanner 112 also includes a distance measured-point location calculator that calculates a three-dimensional location of a reflection point at which the distance measuring laser light is reflected, on the basis of its own location, the measured distance, and the measured direction. The laser scanner 112 further includes a scan controlling unit that controls the emitting direction of the distance measuring laser light and the light receiving direction of the distance measuring laser light reflected back or of the optical axis of the distance measuring laser light.

The distance measuring laser light is output of pulses with a predetermined repetition frequency and is emitted to a predetermined area to scan the area. The distance to the reflection point is calculated from the time-of-flight of the distance measuring laser light. Normally, the distance to the object or the target is calculated from a phase difference between reference light, which passes through a reference optical path provided in the device, and distance measuring laser light that is reflected back from the object or the target. The three-dimensional location of the reflection point is calculated from the measured distance, the emitting direction of the distance measuring laser light, and the location of the laser scanner 112. Multiple measurements of the locations of the reflection points provide point cloud data.

The TS 100 is installed at a location of which coordinates in the map coordinate system are known or a location that is accurately positioned by the location measuring unit 107. The position and direction of the laser scanner 112 in the TS 100 are obtained in advance and are known information, and the location in the map coordinate system of the laser scanner 112, that is, the location of the origin of the scanning, are preliminarily obtained. In this example, the TS 100 is arranged at the origin of the XYZ coordinate system in FIG. 2, and the laser scanning data is obtained by the laser scanner 112 as coordinate data of points in the XYZ coordinate system.

The emission of the distance measuring laser light of a predetermined oscillation frequency to scan the target provides three-dimensional coordinates of each of a great number of reflection points on the target. The three-dimensional coordinates are of a coordinate system having the origin at the laser scanner 112. The set of the great number of the reflection points on the target is used as point cloud data. The point cloud data shows the target in the form of a set of dots of which three-dimensional locations are determined.

The laser scanner 112 can allocate colors to the points of the point cloud data on the basis of colors that are obtained from the photographed images taken by the camera 101. Additionally, a reflection intensity of the point may be measured to obtain data relating to the reflection intensity of each point of the point cloud data.

The laser scanner 112 performs laser scanning primarily on an airspace centered on the UAV 200, which is tracked by the UAV track controlling unit 111, and obtains data of the laser scanning light reflected from the targets 401 to 404. That is, in the condition in which the TS 100 is tracking the reflective prism 202 of the UAV 200, the distance measuring unit 103 orients the UAV 200 that is flying and measures a distance to the UAV 200, or more exactly, the reflective prism 202. Thus, the direction of the UAV 200 as viewed from the TS 100 is known by the TS 100. The laser scanner 112 performs the laser scanning primarily in the direction of the UAV 200 as viewed from the TS 100 and thereby efficiently obtains data of the laser scanning light reflected from the targets 401 to 404.

The laser scanner 112 obtains data of three-dimensional coordinate values of scanning points having the origin at the TS 100 and data of times of acquiring the corresponding scanning points. In other words, the laser scanner 112 obtains point cloud data, in which three-dimensional coordinates having the origin at the TS 100 are determined, in association with times of acquiring the corresponding points constituting the point cloud data. The time is counted on the basis of time data received from a GNSS navigation satellite by the location measuring unit 107.

The laser scanning area setting unit 113 sets a scanning area of the laser scanner 112. The direction of the UAV 200 or the reflective prism 202 as viewed from the TS 100 is determined from the output from the horizontal and vertical direction measuring unit 104. The laser scanning area setting unit 113 sets a scanning area at an area of an airspace centered on the direction of the UAV 200, which is obtained from the output from the horizontal and vertical direction measuring unit 104. The setting of the laser scanning area enables effective laser scanning of the targets 401 to 404.

The laser scanning of the targets 401 to 404 must be performed approximately at a density such that the radiuses of curvature of the targets 401 to 404 are obtained, and the laser scanning is desirably performed at the greatest possible density. In view of this, setting a laser scanning area so as to allow laser scanning primarily in the direction of the UAV 200 as viewed from the TS 100, enables increase in the scanning density with respect to the targets 401 to 404, thereby increasing accuracy of identification and locating of the targets 401 to 404.

The scanning area is set so as to contain at least three of the targets 401 to 404. In a case of calculating an attitude of the UAV 200 by also using the reflective prism 202, the scanning area is set so as to contain at least two of the targets 401 to 404. Normally, an area centered on the direction to the UAV 200 and containing the entirety of the UAV 200 is set, and the laser scanning is performed in this area. The control microcomputer 114 controls the processing procedure, which is described later, and also controls the entire operation of the TS 100.

Survey Data Processing Device

Figure 4:
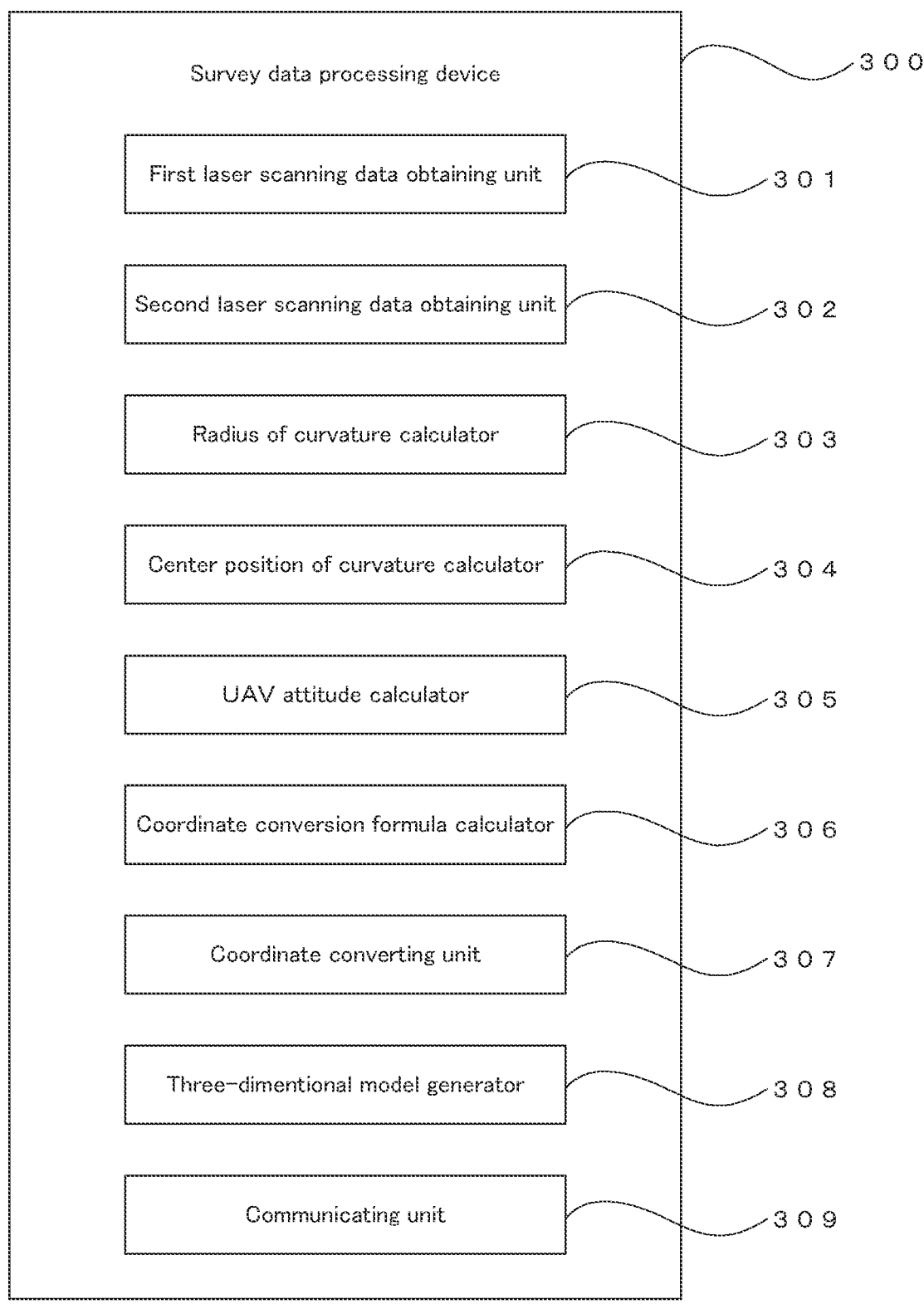
FIG. 4 is a block diagram of the embodiment.

FIG. 4 is a block diagram of a survey data processing device 300. The survey data processing device 300 performs a process for converting the coordinate system of the laser scanning data obtained by the UAV 200 into the ground coordinate system, on the basis of the principle described in relation to FIG. 2. The process performed by the survey data processing device 300 enables generation of a three-dimensional model on the basis of the laser scanning data obtained by the UAV 200 that is flying. Prior to the process of the coordinate conversion, the survey data processing device 300 performs a process for calculating an attitude of the UAV 200 at a respective time.

The survey data processing device 300 includes a first laser scanning data obtaining unit 301, a second laser scanning data obtaining unit 302, a radius of curvature calculator 303, a center position of curvature calculator 304, a UAV attitude calculator 305, a coordinate conversion formula calculator 306, a coordinate converting unit 307, a three-dimensional model generator 308, and a communicating unit 309.

The survey data processing device 300 functions as a computer and includes a CPU, a memory, other arithmetic circuits, an interface circuit, and an interface function. The survey data processing device 300 may be implemented by an electronic circuit, for example, a central processing unit (CPU), an application specific integrated circuit (ASIC), or a programmable logic device (PLD) such as a field programmable gate array (FPGA).

The survey data processing device 300 may also be implemented by using a personal computer (PC) or a workstation (WS). In this case, an operation program for implementing each of the functional units in FIG. 4 is installed in the PC or the WS and is executed to construct each of the functional units in FIG. 4 by using software. Some of the functional units can be constructed of dedicated hardware such as an FPGA.

Whether each of the functional units is to be constructed of dedicated hardware or is to be constructed of software so that programs are executed by a CPU is selected in consideration of necessary operating speed, cost, amount of electricity consumed, and other factors. Constructing the functional unit by dedicated hardware and constructing the functional unit by software are equivalent to each other from the viewpoint of obtaining a specific function.

One or more of the functional units shown in FIG. 4 may be implemented by a separate piece of hardware that is connected through a data communication line. For example, some of the functions shown in FIG. 4 can also be embodied by using a data processing server that is connected through an internet line.

In a case of implementing the survey data processing device 300 by using a PC or a WS, the survey data processing device 300 is operated by using an interface of the PC or the WS, such as a graphical user interface (GUI). The operation of the survey data processing device 300 can also be performed by using a dedicated terminal, a smartphone, a tablet, or other device.

The first laser scanning data obtaining unit 301 retrieves laser scanning data obtained by the laser scanner 112 of the TS 100. The laser scanning data contains three-dimensional coordinates of each scanning point in the XYZ coordinate system in FIG. 2 having the origin at the TS 100 and also contains time of acquiring each scanning point.

The second laser scanning data obtaining unit 302 retrieves laser scanning data obtained by the laser scanner 201 of the UAV 200. This laser scanning data contains three-dimensional locations in the three-dimensional coordinate system having the origin at the UAV 200 or at the laser scanner 201. This three-dimensional coordinate system is a UAV coordinate system represented by the $X_n Y_n Z_n$ coordinate system in FIG. 2. This coordinate system is fixed relative to the UAV 200, and a relationship between the direction of the coordinate system and the structure of the UAV 200 is obtained in advance. For example, the relationship between the structure of the UAV 200 and the three-dimensional coordinate system of the UAV coordinate system represented by the $X_n Y_n Z_n$ coordinate system is predetermined such that a forward direction of the UAV 200 is an X-axis direction, a leftward direction is a Y-axis direction, and a vertical upward direction is a Z-axis direction.

Since the $X_n Y_n Z_n$ coordinate system is fixed relative to the UAV 200, the location and direction in the XYZ coordinate system of the ground coordinate system vary with the movement of the UAV 200. Naturally, while the UAV 200 remains still, the location in the $X_n Y_n Z_n$ coordinate system does not vary relative to the XYZ coordinate system. Also, when there is no variation in the direction even though the UAV 200 moves, the direction in the $X_n Y_n Z_n$ coordinate system does not vary relative to the XYZ coordinate system.

The radius of curvature calculator 303 calculates a radius of curvature of each of the targets 401 to 404 on the basis of the result of the laser scanning relative to the targets 401 to 404, which is performed by the laser scanner 112. The specified radius of the curvature of each of the targets 401 to 404 is known, and therefore, calculation of the radius of the curvature that matches with the known specified radius of the curvature enables identification of the targets 401 to 404.

This process performs operation for calculating a spherical surface that is fit with the laser scanning point cloud to obtain a curvature of the spherical surface. In this embodiment, the curvature of each of the targets 401 to 404 is known, and laser scanning points that are fit to a curved surface corresponding to the curvature are extracted.

The center position of curvature calculator 304 calculates the center position of curvature of the spherical surface, of which the radius of the curvature is calculated by the radius of curvature calculator 303 and matches with the specified radius of the curvature of each of the targets 401 to 404. This process calculates coordinates of the center of curvature of the curved surface formed by the laser scanning point cloud that fits to the curved surface having the specified radius of curvature.

The identification of the targets 401 to 404 and the locating of the centers of curvature of the targets 401 to 404 use the laser scanning point cloud, which is point cloud data obtained by means of the laser scanning. This laser scanning point cloud is desirably obtained during the shortest possible period Δt with the time $t_n$ in its midpoint on the time axis. Since the TS 100 performs laser scanning while the UAV 200 flies and moves, if the period Δt is large, the laser scanning point cloud obtained by the laser scanner 112 tends to not exactly reflect the shape of the laser scanned object, which is the UAV 200 in this embodiment.

For this reason, the period Δt is set as short as possible in consideration of scanning speed, scanning density, and scanning resolution of the laser scanner 112 and the desired accuracy of the measurement result of the attitude of the UAV 200.

The UAV attitude calculator 305 obtains an attitude of the UAV 200 on the basis of the laser scanning data retrieved by the first laser scanning data obtaining unit 301, which is the laser scanning data obtained by the laser scanner 112 of the TS 100. This process is performed on the basis of the coordinates of at least three points, that is, the coordinates of the locations of at least three of the targets 401 to 404, which are calculated by the center position of curvature calculator 304.

The coordinates of at least three points, which are calculated by the center position of curvature calculator 304, are respectively identified as of the locations of the respective targets 401 to 404. This identification depends on the difference in the known specified values of the radiuses of curvature. The relationships between the direction of the UAV 200 and the positions of the targets 401 to 404 are also known. Thus, the attitude of the UAV 200 is obtained from the coordinate values of at least three points, which are calculated by the center position of curvature calculator 304.

The coordinate conversion formula calculator 306 calculates the conversion formula represented by the first formula, which is necessary to perform the coordinate conversion for describing the scanning points of the point cloud data in the $X_n Y_n Z_n$ coordinate system into the XYZ coordinate system. Specifically, as described in relation to FIG. 2, a rotation matrix $R_n$ at the time $t_n$ is calculated from a tilt of the $X_n Y_n Z_n$ coordinate system at the time $t_n$ relative to the XYZ coordinate system, and also, a translation vector $T_n$ is calculated from the difference in the position of the origin O between the $X_n Y_n Z_n$ coordinate system and the XYZ coordinate system at the time $t_n$. The rotation matrix and the translation vector $T_n$ are calculated with respect to each time represented by the time $t_n$.

The rotation matrix $R_n$ at the time $t_n$ is calculated as described below. First, the tilt of the $X_n Y_n Z_n$ coordinate system relative to the XYZ coordinate system is obtained from the attitude of the UAV 200 at the time $t_n$. The attitude of the UAV 200 at the time $t_n$ is already calculated by the UAV attitude calculator 305 on the basis of the center positions of the curvature of the targets 401 to 404, which are obtained from the laser scanning point cloud obtained by the laser scanner 112 at the time $t_n$ or at the timing that can be considered as being the time $t_n$. Thus, the tilt is obtained from the attitude of the UAV 200 at the time $t_n$ on the basis of the calculation result of the UAV attitude calculator 305, whereby the rotation matrix $R_n$ at the time $t_n$ is obtained.

The translation vector $T_n$ at the time $t_n$ is calculated as a vector starting from the location $O_n$ of the UAV 200, which is positioned by the TS 100 at the time $t_n$, and ending at the location O of the TS 100.

The coordinate converting unit 307 uses the first formula, which is obtained on the basis of the rotation matrix $R_n$ and the translation vector $T_n$ with respect to each time represented by the time $t_n$, to convert the coordinate system of the scanning points in the $X_n Y_n Z_n$ coordinate system into the XYZ coordinate system. There is no limitation to the number of the laser scanning point clouds obtained from the laser scanner 201, which are to be used as data obtained at the time $t_n$. From a practical point of view, the time $t_n$ may be a period of some time, and laser scanning point clouds obtained during this period may be processed as data that is obtained at the time $t_n$.

The three-dimensional model generator 308 generates a three-dimensional model on the basis of the laser scanning point cloud data, which is obtained by using the laser scanner 201 and is subjected to the coordinate conversion into the XYZ coordinate system. The technique of generating a three-dimensional model based on point cloud data may be found in WO 2011/070927 and Japanese Unexamined Patent Applications Laid-Open Nos. 2012-230594 and 2014-035702, for example.

The communicating unit 309 communicates with an external device, as in the communicating unit 108. If the communicating unit mounted on the UAV 200, the communicating unit 108 mounted on the TS 100, and the communicating unit 309 mounted on the survey data processing device 300 can communicate among themselves in real time, the laser scanning performed by the UAV 200 and the process performed by the survey data processing device 300 can be performed in parallel.

Example of Processing

The following describes an example of a process relating to obtaining of exterior orientation parameters of the UAV 200 or of the laser scanner 201 and the coordinate conversion from the UAV coordinate system into the ground coordinate system.

(1) Obtaining of Exterior Orientation Parameters of UAV 200

Figure 5:
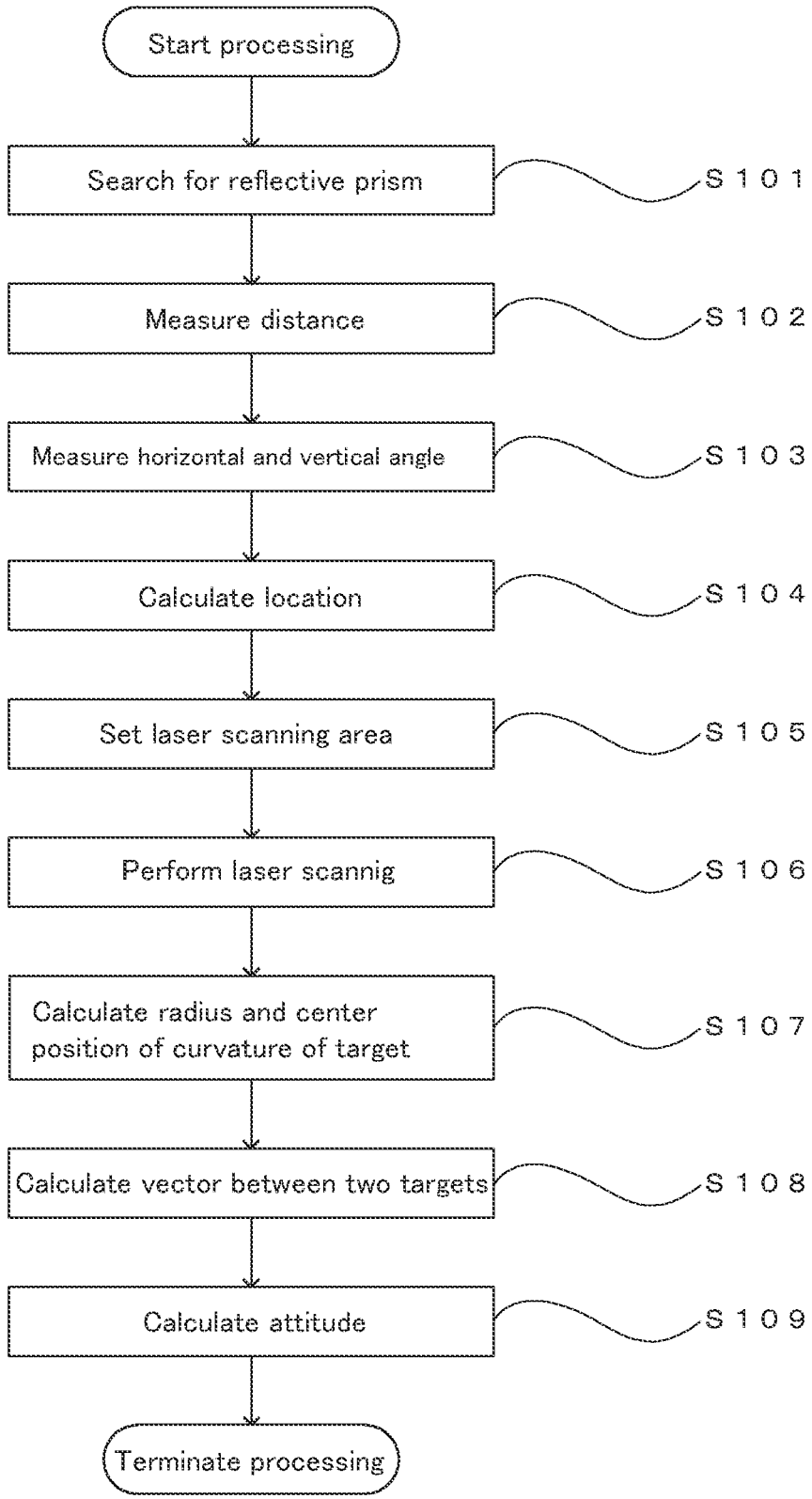
FIG. 5 is a flowchart showing an example of a processing procedure.

The following describes an example of a processing procedure for obtaining the exterior orientation parameters (location and attitude) of the UAV 200, in line with the flowchart in FIG. 5. The programs for executing the processing in FIG. 5 are stored in an appropriate storage region or a storage medium and are read therefrom to be executed. This also applies to the processing in FIG. 6.

First, the reflective prism 202 of the UAV 200 is searched for and tracked by using the searching laser light emitted from the target searching unit 102 of the TS 100 (step S101). Then, the distance measuring laser light is emitted to measure the distance from the TS 100 to the UAV 200 by the distance measuring unit 103 (step S102) and to measure a horizontal angle and a vertical angle by the horizontal and vertical direction measuring unit 104 (step S103). Thereafter, the target location calculator 109 calculates the location of the reflective prism 202 from the distance and the direction and also calculates the location of the UAV 200 or of the laser scanner 201 from the preliminarily examined position relationship between the reflective prism 202 and the UAV 200 or the laser scanner 201 (step S104).

Next, the laser scanning area setting unit 113 of the TS 100 sets a laser scanning area containing at least three of the targets 401 to 404 by centering the location of the UAV 200 obtained in step S104 (step S105). The laser scanner 112 performs laser scanning in the laser scanning area set in step S105 (step S106).

The laser scanning data already obtained by the TS 100 is transmitted to the survey data processing device 300. At this stage, the survey data processing device 300 receives scanning data of the targets 401 to 404 from the TS 100. In this embodiment, the laser scanning data obtained by the laser scanner 112 and the laser scanning data obtained by the laser scanner 201 are processed in a later process, and these two kinds of laser scanning data are transmitted to the survey data processing device 300 after the flight of the UAV 200 is completed.

After the laser scanning data obtained by the laser scanner 112 is received by the survey data processing device 300, the radiuses of curvature of the targets 401 to 404 are calculated on the basis of this laser scanning data. The difference in the radiuses of curvature makes the targets 401 and 404 to be identified from each other. In addition, the center positions of the curvature are also obtained by referring to the semispherical shapes of the targets 401 to 404 (step S107).

The UAV attitude calculator 305 mounted on the survey data processing device 300 calculates a vector that shows an attitude of the UAV 200, from three-dimensional locations of at least three positioned targets (step S108). This calculated vector is used to calculate the attitude of the UAV 200 in the ground coordinate system (step S109).

Figure 6:
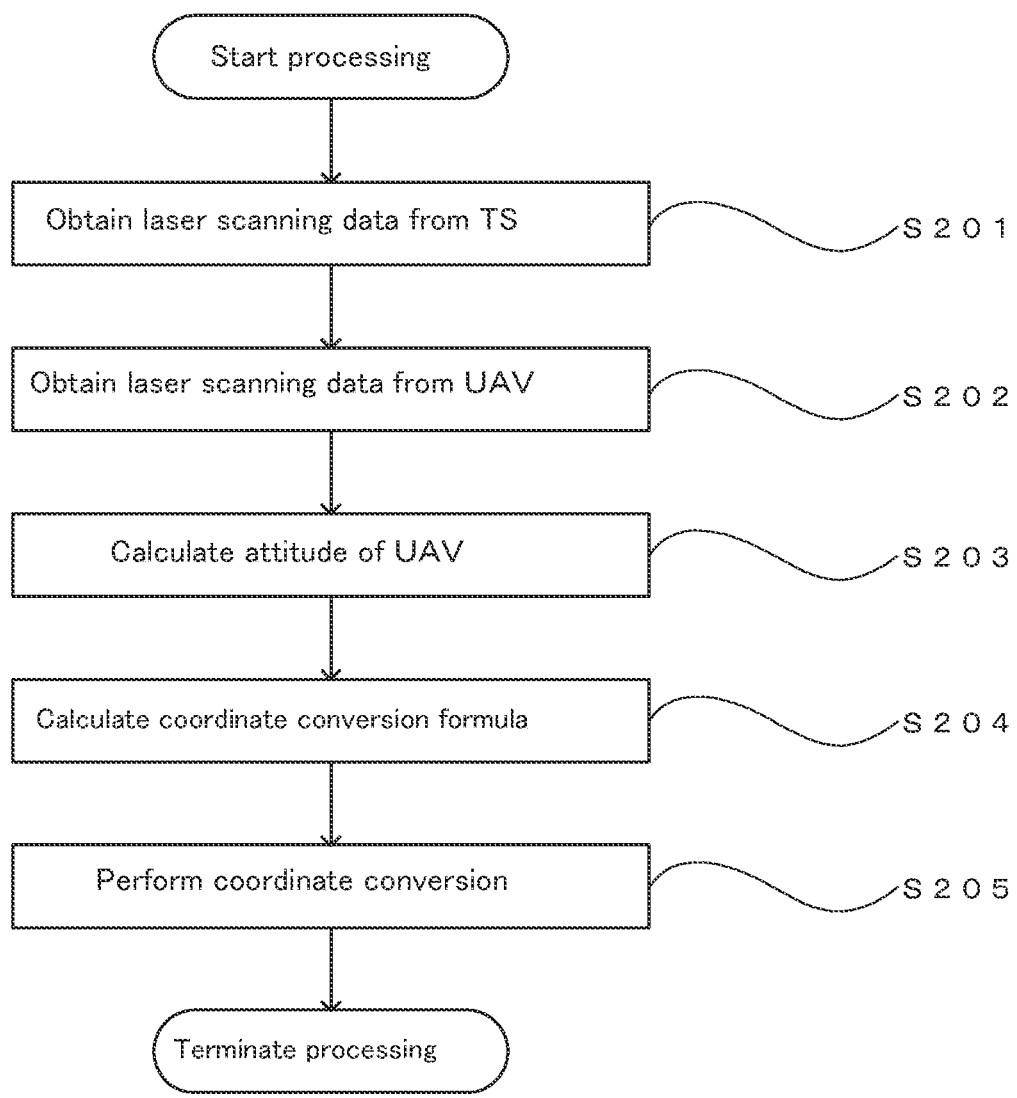
FIG. 6 is a flowchart showing an example of another processing procedure.

(2) Convert Coordinate System of Laser Scanning Point Cloud Obtained by the UAV 200 into Ground Coordinate System The following describes an example of a processing procedure for converting the coordinate system of the laser scanning point cloud obtained from the UAV 200 into the ground coordinate system, in line with the flowchart in FIG. 6. First, the first laser scanning data obtaining unit 301 retrieves laser scanning data obtained by the laser scanner 112 of the TS 100 (step S201). Meanwhile, the second laser scanning data obtaining unit 302 retrieves laser scanning data obtained by the laser scanner 201 of the UAV 200 (step S202).

Next, the UAV attitude calculator 305 calculates an attitude of the UAV 200 by using the laser scanning data retrieved by the first laser scanning data obtaining unit 301 (step S203). The processes up until this step are the same as those described in FIG. 5.

Thereafter, the coordinate conversion formula calculator 306 calculates a rotation matrix $R_n$ and a vector $T_n$ from the attitude of the UAV 200, which is calculated by the UAV attitude calculator 305, and uses the resultant rotation matrix $R_n$ and the resultant vector $T_n$ to further calculate the conversion formula represented by the first formula (step S204).

Finally, the coordinate converting unit 307 performs coordinate conversion from the three-dimensional coordinate system into the ground coordinate system by using the first formula calculated by the coordinate conversion formula calculator 306 (step S205).

Effects

Tracking and positioning of the UAV 200 that is flying are performed by using the target tracking function and the target positioning function of the TS 100, and at the same time, laser scanning of the UAV 200 is performed by the laser scanning function of the TS 100, to determine the attitude of the UAV 200. This processing enables highly accurate calculation of exterior orientation parameters (location and attitude) of the UAV 200 at the same time as tracking of the UAV 200. Moreover, the determination of the exterior orientation parameters of the UAV 200 enables coordinate conversion of the coordinate system of the laser scanning data, which is obtained by the laser scanner 201 mounted on the UAV 200, into the ground coordinate system, thereby generating a three-dimensional model in the ground coordinate sy stem.

FIRST MODIFICATION EXAMPLE

The method for identifying the targets 401 to 404 from each other may use color information. With use of the laser scanning, color data can be obtained from the photographed images taken from the camera and can be allocated to scanning point clouds of the obtained point cloud data. This color information of the scanning point clouds may be used to identify the targets 401 to 404 from each other. In this case, the targets 401 to 404 are made to have different colors in advance, and the identification of the targets 401 to 404 is performed depending on the difference in the color data of the scanning point clouds. In another case, the targets 401 to 404 may be identified from each other by using both the radius of curvature and the color.

SECOND MODIFICATION EXAMPLE

The following method can also be used for calculating the attitude of the UAV 200 by the UAV attitude calculator 305. This method calculates the attitude of the UAV 200 from locations of at least two of the targets 401 to 404 and the location of the reflective prism 202. In this case, the positions of the targets 401 to 404 and of the reflective prism 202 relative to the UAV 200 and the relative position relationship thereof are obtained in advance.

Under these conditions, after three-dimensional locations in the XYZ coordinate system of at least two of the targets 401 to 404 are obtained by the laser scanner 112, and the three-dimensional location in the XYZ coordinate system of the reflective prism 202 is obtained by the three-dimensionally target-positioning function of the basic function of the TS 100, different locations of three or more points in the UAV 200 are determined.

After three or more different points in the UAV 200 are determined in the XYZ coordinate system, the attitude of the UAV 200 in the XYZ coordinate system of the ground coordinate system is calculated. That is, locations of at least two of the targets 401 to 404 are determined by the laser scanner 112, and also, the location of the reflective prism 202 is determined by the target location calculator 109. The two of the targets 401 to 404 may be represented as first and second determined points. The reflective prism 202 may be represented as a third determined point. Then, the attitude of the UAV 200 is calculated from the locations of the first to the third determined points.

THIRD MODIFICATION EXAMPLE

The targets 401 to 404 may use reflective prisms. In this case, the reflective prisms may be made of colored glass or fluorescent glass so as to have characteristics of reflecting a wavelength, which differs from others. The light receiving unit of the laser scanner 112 of the TS 100 may be made to detect light by using optical filters for selecting light of different wavelengths reflected from the targets 401 to 404. Moreover, the relationship of wavelength between light reflected from each of the targets 401 to 404 and the distance measuring laser light used by the distance measuring unit 103 is adjusted in order to differentiate the light reflected from each of the targets 401 to 404 and the light reflected from the reflective prism 202, from each other.

In this case, the identification of the targets 401 to 404 is performed by recognizing the difference in the wavelength or in the wavelength spectrum of the light reflected from each of the targets 401 to 404. As in the case of the semispherical targets, the locations of at least three of the targets 401 to 404 are necessary.

FOURTH MODIFICATION EXAMPLE

A reflector having a reflection shape showing the attitude of the UAV 200 may be arranged and be scanned by the laser scanning light, and the attitude of the UAV 200 may be obtained from the laser scanning data of the reflector. In this case, the reflector is made of a member having a reflection characteristic that allows distinguishing of the reflector from other parts by laser scanning, or the reflector may be made by coating or surface treatment. The reflection shape showing the attitude of the UAV 200 may be a shape that enables easy recognition of the direction, such as an arrow or a triangle. This technique may be found in, for example, Japanese Patent Application No. 2017-137832.

FIFTH MODIFICATION EXAMPLE

The TS 100 captures and photographs the UAV 200 by using the camera 101. The photographed image may be analyzed, and the analysis result may be used to calculate the attitude of the UAV 200.

SIXTH MODIFICATION EXAMPLE

The method for measuring the attitude of the UAV 200 by the TS 100 may use the shape of the UAV 200. For example, the UAV 200 in FIG. 1 has arms 405 in the form of a cross shape that extends in the four quadrants from the center of the body of the UAV 200, and the UAV 200 has a motor and a propeller at each end of the arms 405. This frame structure in the form of the cross shape may be obtained from the laser scanning point cloud to measure the tilt of the UAV 200 from a horizontal plane.

A specific example of the processing will be described hereinafter. The processing described below is performed by the UAV attitude calculator 305 of the survey data processing device 300.

First, reference data relating to the shape of the UAV 200 is preliminarily obtained. In this condition, point cloud data that fits to the reference data is extracted from the laser scanning point clouds obtained by the laser scanner 112 of the TS 100.

Next, the attitude of the extracted point cloud data that corresponds to the UAV 200 is calculated. For example, an equation of a plane that fits to point clouds constituting the arms of the cross structure of the UAV 200 is established, and a tilt of the plane is calculated relative to the horizontal plane. At this time, under the condition that the front and rear or the left and right of the UAV 200 are recognized, the attitude of the UAV 200 is obtained.

In this case, if the cross shape of the UAV 200 is asymmetric in the front and rear or the left and right or both, the front and the rear of the UAV 200 can be recognized from the laser scanning data, and an exact attitude of the UAV 200 is obtained. In a case in which the cross shape of the UAV 200 is symmetric, an approximate attitude of the UAV 200 is obtained from the IMU or the azimuth sensor mounted on the UAV 200, and then, data of an accurate attitude of the UAV 200 is obtained by considering data of the attitude previously obtained from the laser scanning point cloud. In this case, even if the accuracy of the IMU or the azimuth sensor of the UAV 200 is not high, the attitude of the UAV 200 is obtained at high accuracy from the laser scanning data on the condition that an approximate direction is determined from the output of the IMU or the azimuth sensor.

The method using the shape of the UAV 200 enables calculation of the attitude of the UAV 200 by using light reflected from at least three points on the condition that the reflection points of the UAV 200 are determined.

The measurement of the attitude of the UAV 200 using the laser scanning light reflected from the body of the UAV 200 can be performed by using a shape other than the shape exemplified in FIG. 1. This technique can be used in combination with the technique of measuring the attitude of the UAV 200 using targets, which is disclosed in this specification.

To reliably obtain laser scanning light reflected from the UAV 200, at least a lower surface of the UAV 200 may be subjected to painting or coating to improve reflection of the laser scanning light.

SEVENTH MODIFICATION EXAMPLE

Yet another example of calculating the attitude of the UAV 200 by the TS 100 is described. The processing described below is performed by the UAV attitude calculator 305 of the survey data processing device 300.

Figure 7:
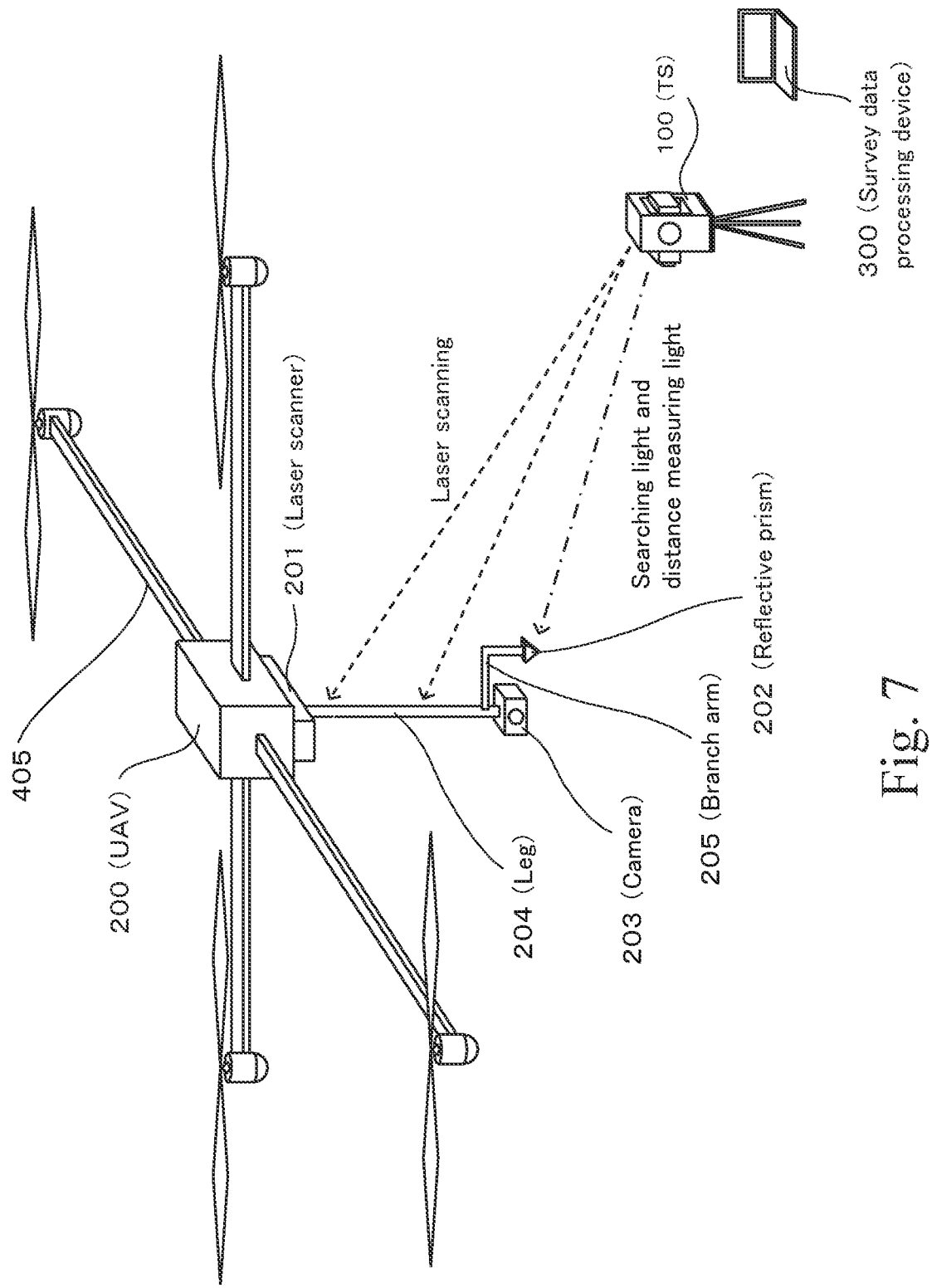
FIG. 7 is an overview of another embodiment.

FIG. 7 shows an example of the UAV 200 having a camera 203 mounted for performing aerial photographing. In this example, a rod-shaped leg 204 is fixed at the bottom of the UAV 200, and the camera 203 is fixed to an end of the leg 204. The leg 204 has an L-shaped branch arm 205 that is fixed at the middle of the leg 204, and the branch arm 205 has an end to which a reflective prism 202 that reflects the searching light and the distance measuring laser light from the TS 100 is attached. In this structure, the reflective prism 202 is at a position offset from an axis line of the leg 204. At this stage, the position relationship between the reflective prism 202 and the camera 203 in the UAV 200, and the attitude information of the camera 203 relative to the UAV 200, are preliminarily obtained and are known. Of course, information of the position of the leg 204 and the extending direction or the direction of the extended axis of the leg 204, relative to the UAV 200, is preliminarily obtained and is known.

In this example, the location of the UAV 200 is measured by the TS 100 by using the distance measuring laser light reflected from the reflective prism 202. The attitude of the UAV 200 is measured by means of laser scanning with respect to the leg 204, which extends in the upward and downward direction, by the laser scanner 112.

The following describes the measurement of the attitude of the UAV 200 by using the leg 204. While the TS 100 tracks the UAV 200 and measures the distance to the UAV 200 or positions the UAV 200, the airspace centered at the UAV 200 is scanned with laser scanning light by the laser scanner 112 of the TS 100. For example, in a case in which the arm 405 has a length of approximately 50 centimeters, the laser scanner 112 performs laser scanning in the airspace with a radius of approximately 1 to 2 meters having the reflective prism 202 at the center.

The point cloud data of the leg 204 is extracted from the resultantly obtained laser scanning point cloud. This process first searches for data of a linearly extending point cloud containing vertically extending components, from the laser scanning data. Then, the found data is fitted to a preliminarily obtained three-dimensional model of the UAV 200 containing the arms 405, whereby highly reliable point cloud data of the leg 204 is obtained.

After the point cloud data of the leg 204 is obtained, a tilt of the UAV 200 relative to the vertical direction is calculated from a relationship between the extending direction of the leg 204 and the vertical direction. Since the three-dimensional location of the reflective prism 202 is calculated by the target location calculator 109 in FIG. 3, the direction of the reflective prism 202 as viewed from the leg 204 can be calculated.

Since the position relationship between the leg 204 and the reflective prism 202 relative to the UAV 200 is known, the determination of the direction of the reflective prism 204 as viewed from the leg 204 enables determination of the direction of the UAV 200 in the horizontal direction. That is, a rotation angle having a rotation axis at the leg 204 of the UAV 200 is determined. Thus, the attitude of the UAV 200 is calculated from the positioning data of the reflective prism 202 and the laser scanning data of the leg 204.

The attitude of the UAV 200 can also be calculated from the positioning data of the reflective prism 202 and the laser scanning data of at least one of the four arms 405, instead of using the laser scanning data of the leg 204. In this case, since the reflective prism 202 is at the position offset from the center of the four arms 405, the direction of the UAV 200 is calculated from the location of the reflective prism 202 and the laser scanning point cloud of at least one of the arms 405. In the case in FIG. 7, the position of the center of the four arms 405 is on an extended line of the leg 204.

As described above, in this example, the UAV includes a longitudinal member that extends in a specific direction and also includes a reflective prism, and the reflective prism is arranged at a position offset from the line of the extended axis of the longitudinal member. With this structure, the UAV is positioned by measuring a distance to the reflective prism with distance measuring laser light, and the attitude or direction of the longitudinal member is measured by scanning the longitudinal member with laser scanning light. Thereafter, the attitude of the UAV is calculated from the relationship between the position of the reflective prism in the UAV and the position and attitude of the longitudinal member. After the attitude of the UAV is calculated, the exterior orientation parameters of the laser scanner or of the camera mounted on the UAV can be obtained.

Other Matters

The above-described methods for calculating the attitude of the UAV 200 can be performed in combination. The technique disclosed in this specification can measure the attitude of the UAV without using a highly accurate IMU but is not intended to exclude mounting of an IMU to the UAV. Thus, the technique for measuring the attitude of the UAV using the technique disclosed in the present specification and the technique for measuring the attitude of the UAV by using the IMU mounted on the UAV may be used together.

For example, the measurement of the attitude is performed primarily by using the IMU mounted on the UAV, and the method disclosed in the present specification may be used as an auxiliary or complementary technique. A typical IMU detects rapid variation in the attitude at relatively high sensitivity, but detects variation in the attitude that varies gradually, at relatively low sensitivity. This tendency is stronger in an IMU of lower cost. In view of this, while minute variation in the attitude may be detected by the IMU, an absolute value of the attitude at a predetermined time interval may be measured by means of the identification and locating of the targets 401 to 404 by the laser scanner 112.

In another example, in the condition in which the TS 100 is tracking the UAV 200, the location and attitude of the UAV 200 are measured by using the TS 100. On the other hand, in the condition in which the TS 100 fails to track the UAV 200 or the TS 100 cannot scan the UAV 200 with laser scanning light, the positioning of the UAV 200 may be performed by a GNSS unit mounted on the UAV 200, and the attitude of the UAV 200 may be measured by the IMU mounted on the UAV 200.

The method of measuring the attitude of the UAV 200 by using the location identifying unit, which uses a GNSS and is mounted on the UAV 200, and the technique of measuring the attitude of the UAV 200 by using the laser scanner 112 disclosed in the present application may be performed in combination.

What is claimed is:

1. A data processing device comprising:
a laser scanning data obtaining unit that obtains laser scanning data, the laser scanning data being obtained by emitting laser scanning light from a laser scanner to an aerial vehicle that is flying, and the laser scanner being fixed relative to a first coordinate system; and
an attitude calculator that calculates an attitude in the first coordinate system of the aerial vehicle that is flying, on a basis of the laser scanning data,
wherein:
the attitude is calculated by using multiple positions in the aerial vehicle,
which are identified on a basis of the laser scanning data,
the aerial vehicle includes multiple targets that are identifiable,
the laser scanning data is obtained by means of laser scanning performed on the multiple targets of the aerial vehicle,
the multiple targets respectively have a curved reflective surface, and
the multiple targets are identified on a basis of a difference in radius of curvature of the curved reflective surfaces.

2. The data processing device according to claim 1, wherein the multiple targets are identified on a basis of difference in dimensions of targets.

3. The data processing device according to claim 1, wherein the multiple targets are identified on a basis of a difference in color of surfaces of the targets.

4. The data processing device according to claim 1, further comprising a scanning area setting unit that sets an area containing at least two of the multiple targets, as a laser scanning area on a basis of a location of the aerial vehicle, and the location of the aerial vehicle being obtained by a location data obtaining unit that obtains data of location of the aerial vehicle in the first coordinate system.

5. The data processing device according to claim 1, wherein the attitude is calculated on a basis of data of laser scanning light reflected from the aerial vehicle.

6. A data processing device comprising:
a laser scanning data obtaining unit that obtains laser scanning data, the laser scanning data being obtained by emitting laser scanning light from a laser scanner to an aerial vehicle that is flying, and the laser scanner being fixed relative to a first coordinate system; and
an attitude calculator that calculates an attitude in the first coordinate system of the aerial vehicle that is flying, on a basis of the laser scanning data,
wherein:
the attitude is calculated by using multiple positions in the aerial vehicle, which are identified on a basis of the laser scanning data,
the aerial vehicle includes multiple targets that are identifiable,
the laser scanning data is obtained by means of laser scanning performed on the multiple targets of the aerial vehicle,
the multiple targets respectively have a curved reflective surface, and
a location of each of the multiple targets is identified by calculating a center of curvature of the corresponding curved reflective surface.

7. A data processing device comprising:
a laser scanning data obtaining unit that obtains laser scanning data, the laser scanning data being obtained by emitting laser scanning light from a laser scanner to an aerial vehicle that is flying, and the laser scanner being fixed relative to a first coordinate system; and
an attitude calculator that calculates an attitude in the first coordinate system of the aerial vehicle that is flying, on a basis of the laser scanning data,
wherein:
the attitude is calculated by using multiple positions in the aerial vehicle, which are identified on a basis of the laser scanning data,
the aerial vehicle includes multiple targets that are identifiable,
the laser scanning data is obtained by means of laser scanning performed on the multiple targets of the aerial vehicle,
the data processing device further comprises a location data obtaining unit that obtains data of location of the aerial vehicle in the first coordinate system, and
the attitude is calculated on a basis of the location of the aerial vehicle in the first coordinate system and the locations of at least two of the multiple targets.

* * * * *